United States Patent
Hsu et al.

(10) Patent No.: US 7,245,682 B2
(45) Date of Patent: Jul. 17, 2007

(54) DETERMINING AN OPTIMAL SAMPLING CLOCK

(75) Inventors: Jen-Tai Hsu, El Dorado Hills, CA (US); Hing-Yan To, Cupertino, CA (US); Andrew M. Volk, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 10/262,601

(22) Filed: Sep. 30, 2002

(65) Prior Publication Data

US 2004/0062329 A1    Apr. 1, 2004

(51) Int. Cl.
*H04L 7/00*       (2006.01)
(52) U.S. Cl. .................. 375/355; 375/371; 375/375
(58) Field of Classification Search ............... 375/355, 375/375, 371
See application file for complete search history.

(56) References Cited

U.S. PATENT DOCUMENTS

| | | | |
|---|---|---|---|
| 6,118,307 A * | 9/2000 | Shi et al. ...................... 327/58 |
| 6,320,921 B1 * | 11/2001 | Gu ............................. 375/376 |
| 6,373,911 B1 * | 4/2002 | Tajima et al. ............... 375/375 |
| 6,861,886 B1 * | 3/2005 | Ludden et al. .............. 327/156 |
| 2002/0085656 A1 * | 7/2002 | Lee et al. .................... 375/355 |

FOREIGN PATENT DOCUMENTS

JP         10303875 A   * 11/1998

\* cited by examiner

*Primary Examiner*—Mohammed Ghayour
*Assistant Examiner*—L. Malek
(74) *Attorney, Agent, or Firm*—Philip A. Pedigo

(57) ABSTRACT

In some embodiments, a phase detector receives a set of sampling clock signals and a data signal and compares each of the clock signals to the data signal. A clock selector selects an optimal sampling clock signal from the set of sampling clock signals based on a trend of a relationship between the clock signals and the data signal. Other embodiments are described and claimed.

5 Claims, 8 Drawing Sheets

DETERMINING AN OPTIMAL SAMPLING CLOCK

This description relates to determining an optimal sampling clock.

BACKGROUND

In order to sample and process an electronic signal, the phase of that signal is first determined. When a serial electronic device, such as a pager, receives a signal, the phase of that signal is not known. Thus there must be a mechanism for determining the phase before sampling and processing.

As shown in FIGS. 1 and 2, in the prior art, an analog receiver 20 listens for an analog input signal sent from a transmitter 22. Specifically, it waits for a trigger, such as a transition from no signal to a signal (200). The receiver 20 then converts the analog signal to a digital signal for sampling (202). An over-sampler 24 then samples the data using multiple clocks 26, producing four sampled signals 28 (204). Here, the clocks are generated by a voltage controlled oscillator 30 and are clocks of the same frequency and four different phases. One of the four clocks will be optimal for sampling the data, as compared to the other three clocks.

An edge detector 32 analyzes the four sampled signals 28. The edge detector 32 detects transitions between digital logic levels (206). Hence it will detect that a sampled signal is the result of a sampling clock sampling the data when it was transitioning from low to high, or from high to low. The results of the edge detector 32 are sent to a decision matrix 34. The decision matrix 34 determines which clock has sampled a transition from low to high and which clock has sampled a transition from high to low (208). The clock whose phase is between the phases of those two clocks is sampling the data roughly at the midpoint of the data pulse (210). Thus, that clock is sampling the data better than any of the others. Data is then sampled by that clock.

The transmitter 22 and receiver 20, however, are independent of one another, and use different clocks. Even if those clocks are intended to be identical in frequency, subtle differences will materialize over time. Take, for example, an external device, such as a CD-ROM player, connected to a personal computer. The CD-ROM player transmits data to a receiver on the personal computer. The CD-ROM player's clock is independent from the personal computer's clock. FIG. 3(a) shows one of the clock phases 40 aligned with the center of the data pulse 42. Although an optimal sampling clock was initially chosen as described above, after a period of time, clock differences can become large enough to make a different clock optimal. FIG. 3(b) shows a different clock 44 sampling the data in the center of the pulse 42.

Because the decision matrix 34 also experiences drift and jitter, the decision matrix 34 may not be able to determine whether a sampling clock of increasing or decreasing phase is now the optimal sampling clock. Furthermore, as the speed of serial communication increases, the bit error rate ("BER"), or the rate at which data is incorrectly sampled, becomes a greater concern.

FIGURES

DETAILED DESCRIPTION

Figure 1:
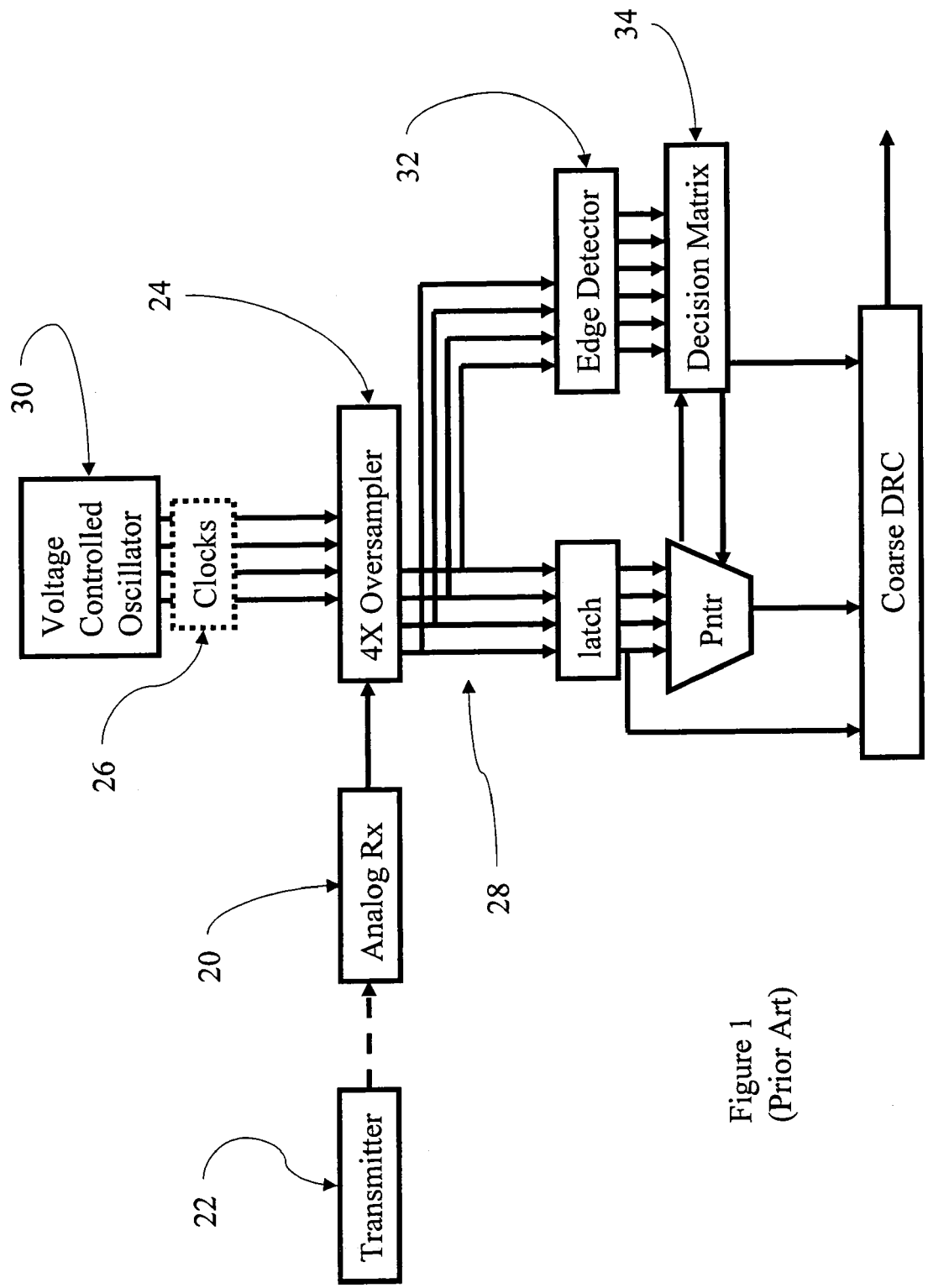
FIG. 1 is a diagram of a sampling system.
Figure 2:
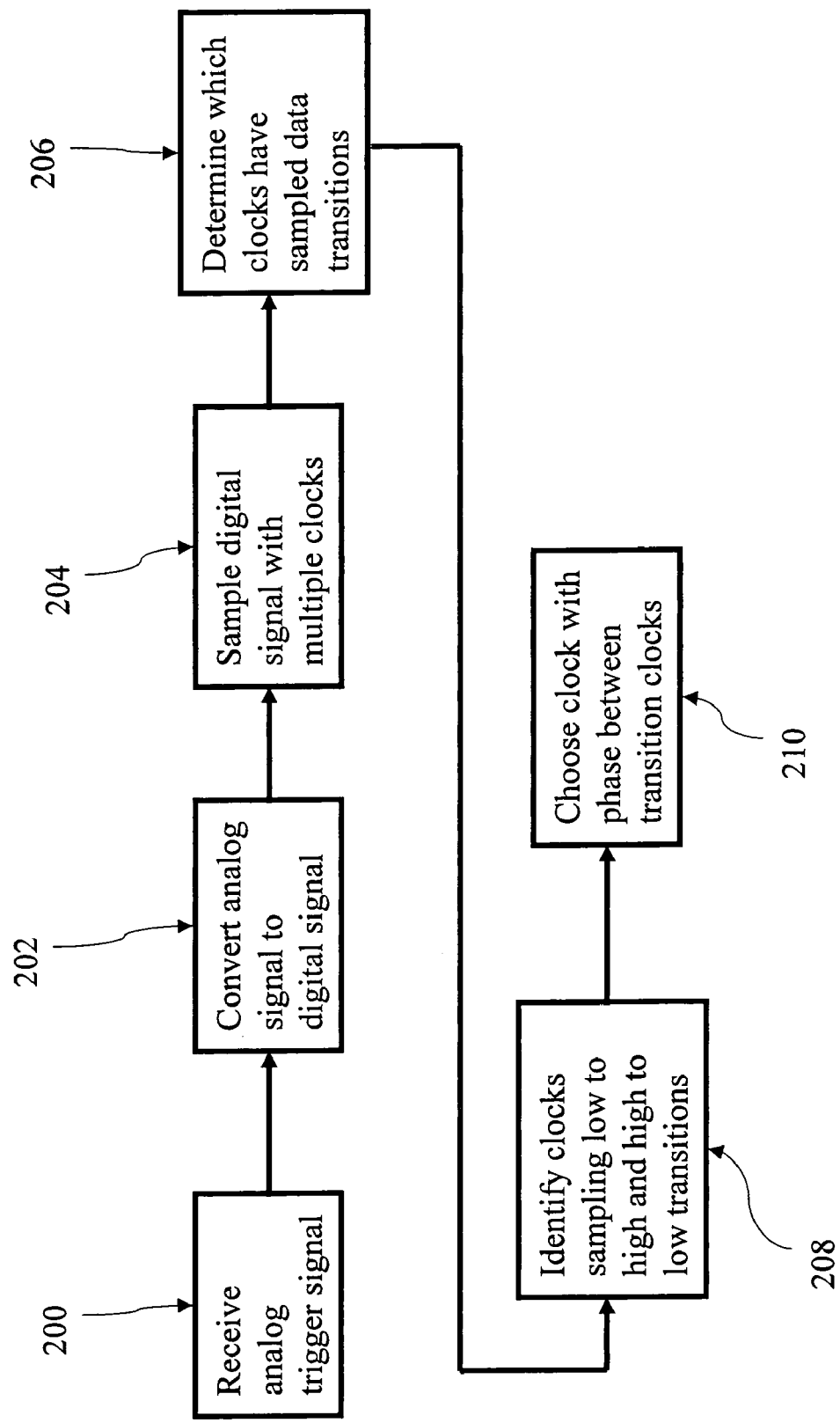
FIG. 2 is a flowchart of a method of determining an optimal sampling clock.
Figure 4:
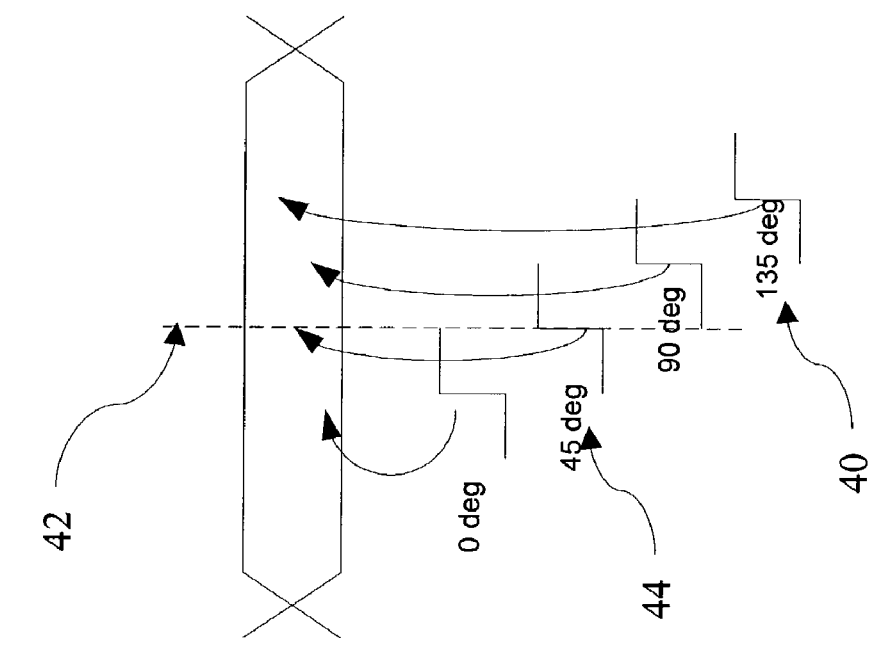
FIGS. 3 and 4 show the alignment of sampling clocks to data pulses.
Figure 3:
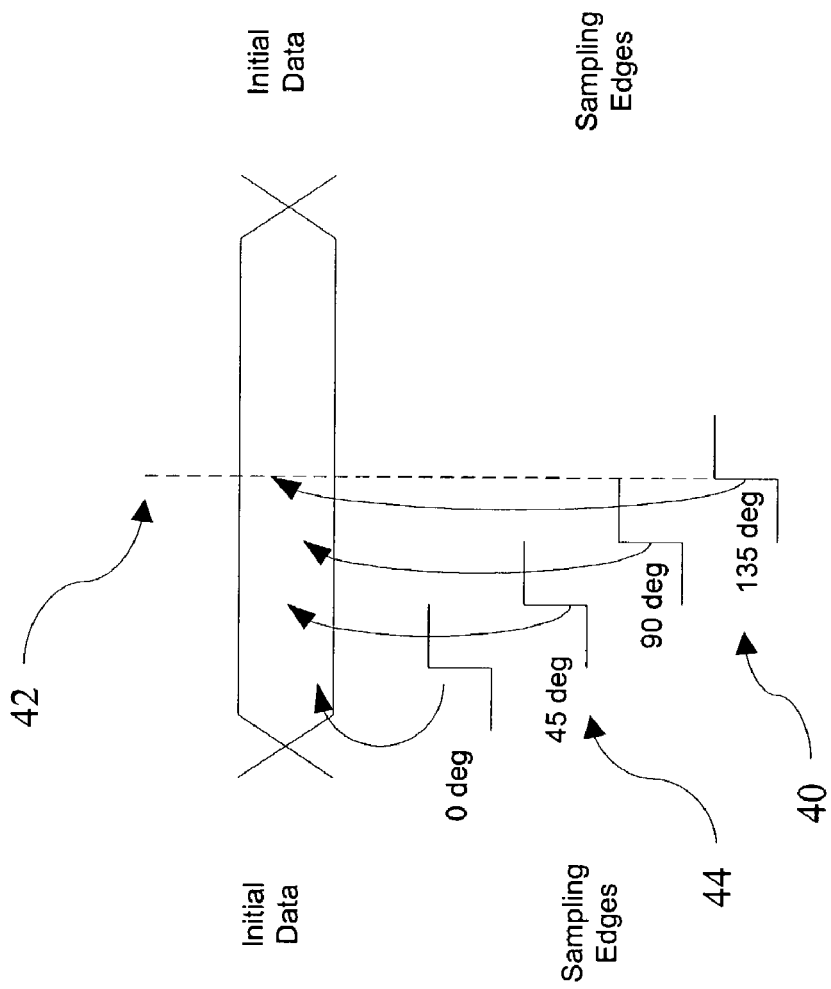
Figure 5:
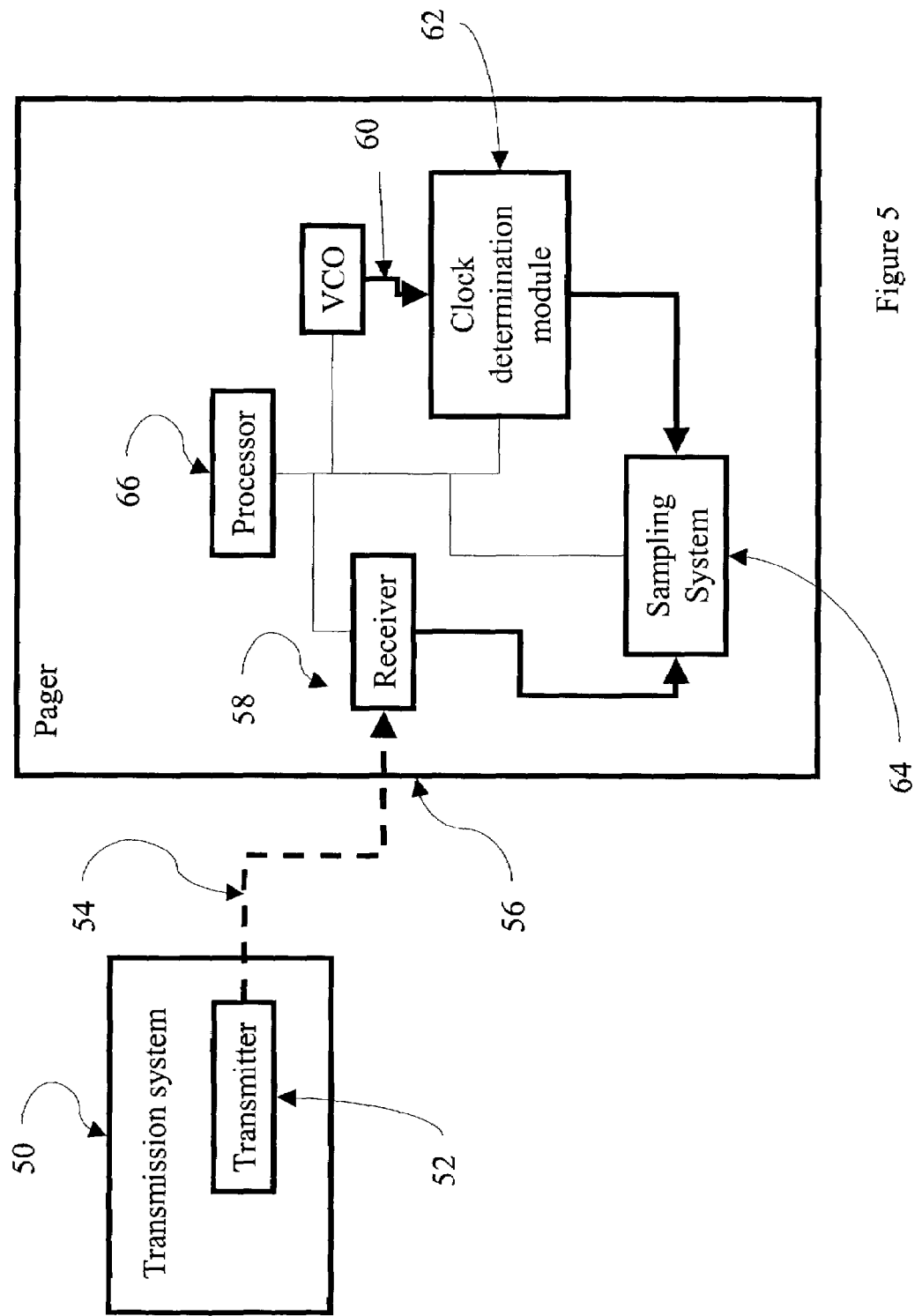
FIG. 5 is a diagram of a communication system including a clock determination module.
Figure 6:
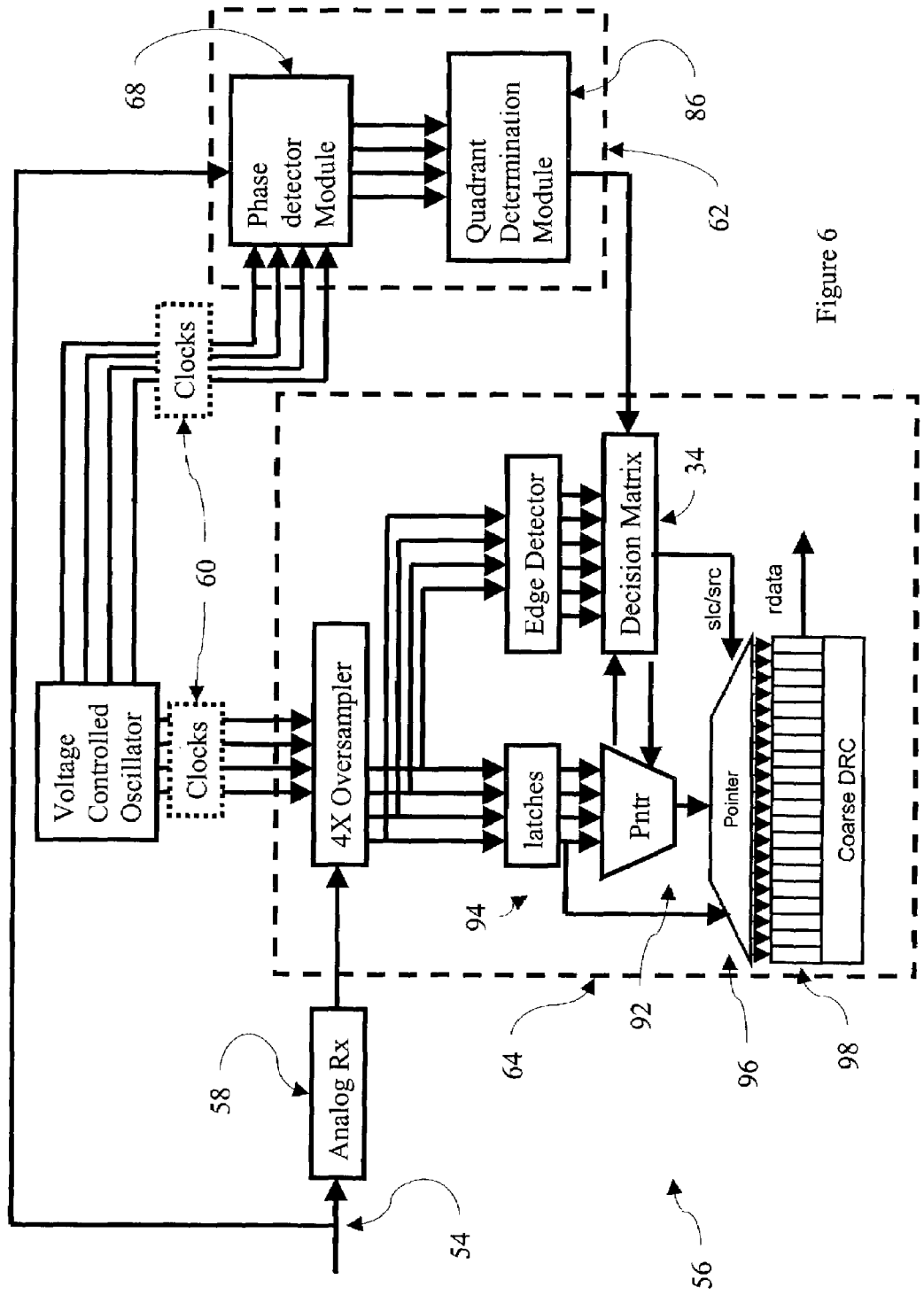
FIG. 6 is a diagram of a clock determination module.

FIGS. 5 and 6 show a system for determining an optimal sampling clock. For example, as FIG. 5 shows, the system can include a transmission system 50 with a transmitter 52 broadcasting a signal 54 to a receiving system such as a pager 56. An analog receiver 58 in the pager 56 receives the signal. The analog input data signal 54 is compared to VCO clocks 60 to determine which of the clocks is optimal. This example uses four clocks, which are the same frequency and four different phases (0 degrees, 45 degrees, 90 degrees, and 135 degrees). However, any N-phase over-sampling scheme can be used.

An optimal clock determination module 62 determines which clock is optimal, and sends this information to a sampling system 64. The sampling system 64 samples the data signal 54 using the optimal sampling clock. The clock determination module 62, the sampling system 64, and the receiver 58 can be controlled by a processor 66.

With reference to FIG. 6, the clock determination module 62 can include a phase detector module 68. The phase detector module 68, which can include at least one quadrature phase detector, is used to compare the analog input data signal 54 to each of the VCO clocks 60. A quadrature phase detector takes as input a clock and a data signal. The output signal of the quadrature phase detector represents the relationship of the data signal to the clock signal.

The quadrature phase detector can include a capacitive circuit, for example a capacitor (not shown). The capacitor can be charged with a known base charge, for example by setting it to ground zero during a system reset. The capacitor can be charged while the clock signal is at a logic high value and the data signal is also at a logic high value, and discharged while the clock signal is at a logic high value and the data signal is at a logic low value. After the charge/discharge cycle, the capacitor may have a residual charge.

The residual charge represents how closely the clock signal is sampling the data signal. For example, if the clock signal is sampling the data signal at roughly the midpoint of the pulse, the charge and discharge times will be roughly equal, and the residual charge of the capacitor will be close to the base charge. If the clock signal is shifted left relative to the data signal, the capacitor will be charged for longer than it is discharged, and the residual charge on the capacitor will be greater than the base charge. Likewise, if the clock signal is shifted right relative to the input pulse, the capacitor will be charged for less time than it is discharged, and the residual charge will be less then the base charge.

Figure 7:
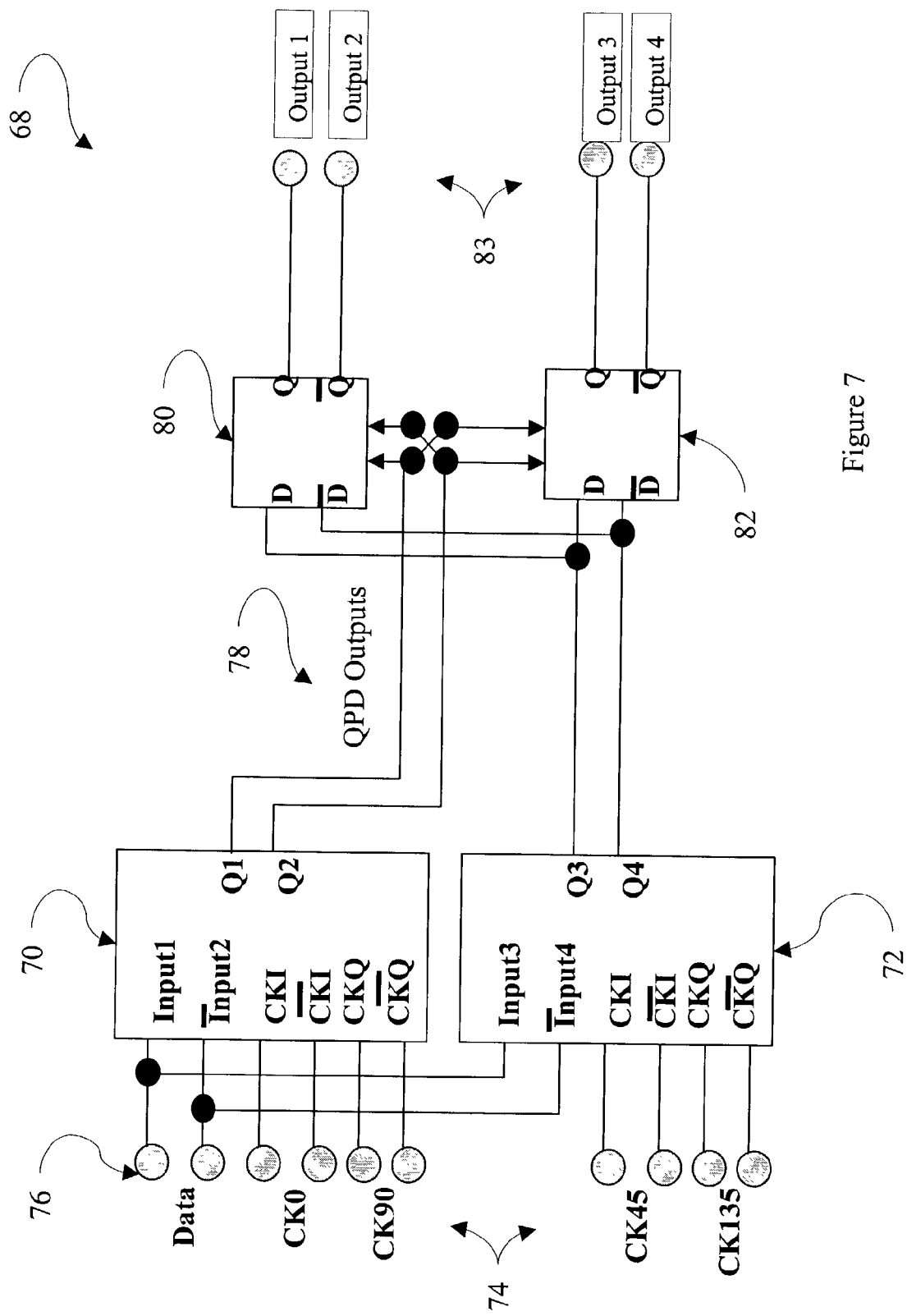
FIG. 7 is a diagram of a phase detector module.

FIG. 7 shows a phase detector module 68 including two quadrature phase detector pairs 70, 72. Each pair of quadrature phase detectors 70, 72 compares two clock signals 74 to the data signal 76. By using two quadrature phase detector pairs, each of the four clock signals can be compared to the data signal. A quadrature phase detector can be instantiated more than four times, and thus a phase determination module can handle N-phase clock sets by instantiating the quadrature phase detector N times. Each quadrature phase detector output signal 78 represents the residual charge on the capacitor included in the corresponding quadrature phase detector. In this example, the input and output signals can include positive and negative signal pairs.

The quadrature phase detector outputs 78 can be analog signals. Because the outputs may diminish over time, the quadrature phase detector output signals can be latched using D-type flip flops or latches 80, 82, to produce latched output signals 83.

Each of these latched output signals 83 can be analyzed and compared to one another with a quadrant determination module 86. The quadrant determination module 86 determines which of the output signals 78 has a time during which it is positive that is most equal to the time during which it is negative. This output signal represents the clock signal that is sampling most closely to the center of the input data pulse.

Figure 9:
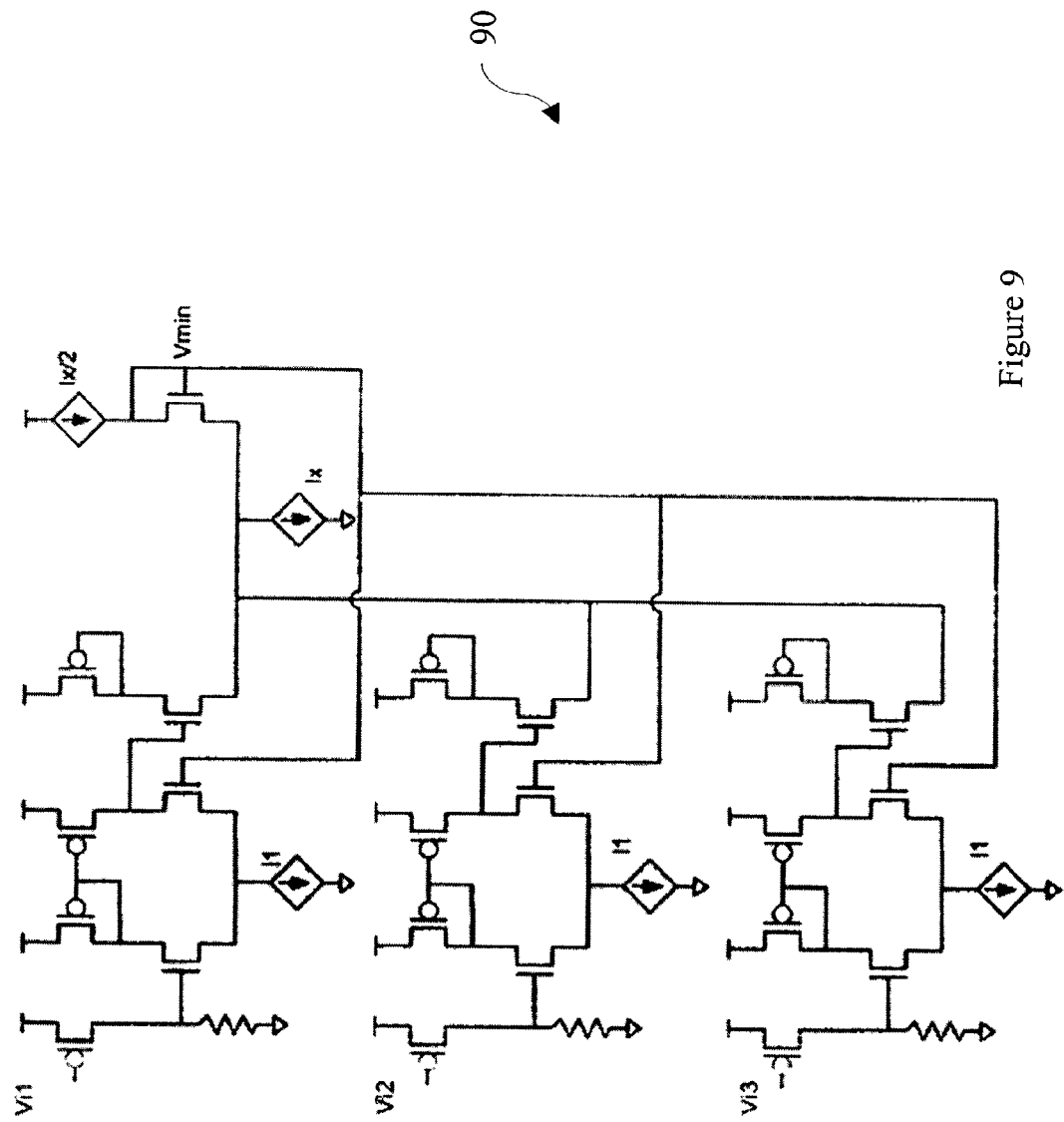
FIG. 9 is a diagram of a winner-take-all circuit.

Each of the output signals 83 can be filtered with charge pump/low pass filter pairs 84 to remove noise. The absolute values of the residual capacitor charges for each of the latched output signals 83 are compared to one another using a voltage comparison module 88. In this example, the capacitor emitting the smallest analog voltage represents the clock/input signal pair that is the most optimal. Thus the voltage comparison module 88 compares the absolute values of the voltages of the analog signals from the discharging capacitors 78, or as in this example the latched output signals 83, to determine which is the smallest. An example of a voltage comparison module 88, a winner-take-all circuit 90, is shown in FIG. 9.

The results of the voltage comparison module 88 can be sent to the decision matrix 34, shown in FIG. 6. Specifically, the voltage comparison module 88 can report which clock phase will optimally sample the data input signal. For example, the winner-take-all circuit 90 can indicate to the decision matrix 34 which of quadrature phase detector outputs 78 has the lowest voltage. The decision matrix 34 can incorporate this information and select the appropriate sampling clock when the optimal clock changes.

As FIG. 6 shows, the four sampled signals, one corresponding to each phase of the clock, can be latched in a set of latches 94. The decision matrix 34 sends a signal to a multiplexor and set of pointers 92, which selects the appropriate data, corresponding to the optimal sampling clock, from the set of latches 94. A second multiplexor and set of pointers 96 sequences the data, and a FIFO 98 buffers the data stream.

Once the optimal sampling clock has been determined, the quadrature phase detectors 70, 72, shown in FIG. 7, can be reset. The capacitors can be reset to the known base charge and the D-type latches 80, 82 can be reset. The capacitors can be reset to the base charge immediately after the optimal sampling clock has been determined. The clock determination module 62 can then continuously monitor the clock signals and data signal to detect whether a different sampling clock is optimal. The capacitors and latches 80, 82 can be reset in response to an instruction from the processor 66, for example, or in response to a system reset.

Figure 8:
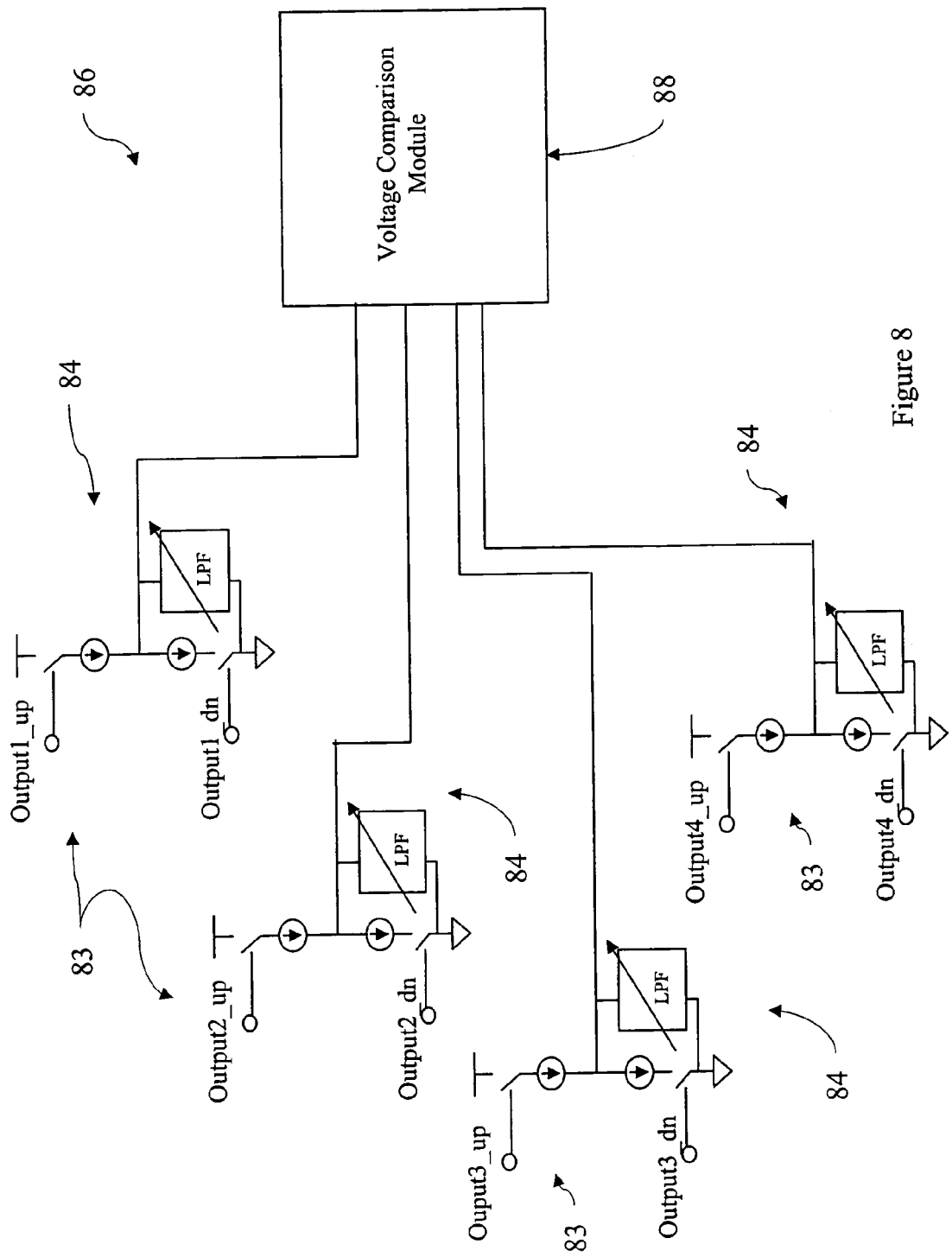
FIG. 8 is a diagram of a quadrant determination module.

The clock determination module 62 can also be used to determine a system time constant. The system time constant is the time it takes for the data signal to drift a certain amount. For example, the phase of the input data signal might drift by 45 degrees with respect to the VCO clock signals in 100 ms. The optimal sampling clock would then change every 100 ms. This is the optimal refresh rate. Once the time constant is determined, the sampling clock can be changed to a new sampling clock every 100 ms to reflect the change in which clock is optimal. The sampling clock can be automatically changed, for example by instruction from the processor 66. Alternately, the charge pump/low pass filter pairs 84, shown in FIG. 8, can be configured to automatically facilitate the change. The low pass filters 84 can be configured with programmable RC time constants. The RC time constants of the low pass filters 84 can be programmed to allow the winner-take-all circuit 90 to reevaluate the output signals 83 at a frequency equal to the refresh rate. The clock determination module 62 in effect remembers the previously optimal sampling clock up to the time that the optimal sampling clock changes. This memory functionality could, alternatively, be accomplished through the use of a digital memory.

The optimal clock determination module 62 can be monitored to determine the system refresh rate. The output of the clock determination module 62 can be measured at two points in time, separated by a predetermined amount of time. The system refresh rate can thus be determined by measuring the amount of drift in the predetermine amount of time.

The optimal refresh rate can be determined from characteristics of the input signal and the VCO. For example, the refresh rate can be optimized based on the low frequency drift and jitter of the input signal and the VCO. The optimal refresh rate can be determined when the system resets and the transmitter sends an alignment sequence. The alignment sequence is a sequence of data that is typically used in serial communications, such as during the handshaking process between the transmitter 52 and the receiver 58, shown in FIG. 5. The alignment sequence can contain a pre-determined data stream with known skew and jitter. For example, the transmission system 50 can send an alignment sequence that includes pre-determined data that is known to the processor 66. After the receiver 58 receives the alignment sequence, the processor 66 can recognize that the following data will be drifted in frequency by a known amount. The drifted data signal that the transmission system 50 sent after the alignment sequence can be the source signal for calibrating the system refresh rate.

Although some implementations have been discussed, other embodiments are also within the scope of the invention.

What is claimed is:

1. A method for determining a sampling clock comprising:
   determining a trend in a relationship between clock signals and received data based on information included in the received data;
   identifying a first clock as an optimal sampling clock for the data based on the trend;
   storing information about characteristics of a previously optimal sampling clock;
   identifying a change in the relationship between the clock signals and the data, in which the first clock is no longer an optimal sampling clock for the data;
   identifying a second clock as an optimal sampling clock for the data;
   determining the refresh rate time between the identification of the first clock as an optimal sampling clock and the identification of the second clock as an optimal sampling clock;
   changing the sampling clock after a time period equal to the refresh rate time; and
   programming an RC time constant value of a low pass filter based on the refresh rate time; and
   using the low pass filter to change the optimal sampling clock based on the RC time constant value.

2. The method of claim 1 in which the first clock is chosen from among a set of sampling clocks of different phases.

3. The method of claim 1 in which the first clock is identified using a quadrature phase detector.

4. The method of claim 1, also including sending an alignment sequence.

5. The method of claim 1, in which the information included in the received data includes pre-determined data.

* * * * *